United States Patent
Ashby

(10) Patent No.: US 7,930,997 B2
(45) Date of Patent: Apr. 26, 2011

(54) CANNINE TRAINING AND CONTROL HARNESS

(76) Inventor: Paula L. Ashby, Nanaimo (CA)

(*) Notice: Subject to any disclaimer, the term of this patent is extended or adjusted under 35 U.S.C. 154(b) by 360 days.

(21) Appl. No.: 12/214,860

(22) Filed: Jun. 23, 2008

(65) Prior Publication Data

US 2009/0000570 A1 Jan. 1, 2009

Related U.S. Application Data

(60) Provisional application No. 60/936,801, filed on Jun. 22, 2007.

(51) Int. Cl.
*A01K 27/00* (2006.01)
(52) U.S. Cl. .................. 119/856; 119/831; 119/863
(58) Field of Classification Search .............. 119/856, 119/712, 814, 831, 834, 835, 163; 54/6.2, 54/24, 85; *A01K 27/00*
See application file for complete search history.

(56) References Cited

U.S. PATENT DOCUMENTS

| | | | | |
|---|---|---|---|---|
| 1,183,974 A | * | 5/1916 | Hintgen | 54/24 |
| 3,564,669 A | * | 2/1971 | Henry | 403/283 |
| 4,137,660 A | * | 2/1979 | Dettmann et al. | 40/303 |
| 4,483,275 A | * | 11/1984 | De Groot | 119/793 |
| 4,566,255 A | * | 1/1986 | DeGroot | 54/24 |
| 4,621,591 A | * | 11/1986 | Anderson et al. | 119/831 |
| 4,722,171 A | | 2/1988 | Meroth | |
| 4,741,288 A | | 5/1988 | Anderson et al. | |
| 4,838,206 A | | 6/1989 | Anderson et al. | |
| 5,038,717 A | * | 8/1991 | Bent | 119/815 |
| 5,086,611 A | * | 2/1992 | Purdy | 54/24 |
| D378,150 S | * | 2/1997 | DuBarry | D30/152 |
| 5,732,660 A | * | 3/1998 | David et al. | 119/792 |
| 5,746,158 A | * | 5/1998 | Landherr | 119/858 |
| 5,992,352 A | * | 11/1999 | Borchelt et al. | 119/856 |
| 6,595,156 B1 | | 7/2003 | Curran | |
| 7,004,114 B2 | * | 2/2006 | Hippensteel | 119/856 |
| D524,997 S | * | 7/2006 | Franco | D30/152 |
| 7,165,380 B2 | * | 1/2007 | Oyster et al. | 54/85 |
| D552,805 S | * | 10/2007 | Holt et al. | D30/152 |
| 7,757,641 B1 | * | 7/2010 | Worden | 119/856 |
| 2005/0217220 A1 | * | 10/2005 | Blocker | 54/24 |
| 2005/0268864 A1 | * | 12/2005 | Gallagher et al. | 119/858 |
| 2007/0051324 A1 | * | 3/2007 | Grayson | 119/831 |
| 2008/0047501 A1 | * | 2/2008 | Madere et al. | 119/863 |

* cited by examiner

*Primary Examiner* — Son T Nguyen
*Assistant Examiner* — Shadi Baniani
(74) *Attorney, Agent, or Firm* — James Ray & Assoc

(57) ABSTRACT

A head harness for walking dogs includes a nosepiece member attached to distal ends of at least one reins member having an attached leash ring, and the nosepiece further being connected to two short connecting straps. A chin strap, a neck collar with a release buckle, and the two short straps are linked at the free ends by a ring connecting means. The reins members are slidingly connected proximal the two distal ends.

7 Claims, 2 Drawing Sheets

CANNINE TRAINING AND CONTROL HARNESS

CROSS REFERENCE TO RELATED APPLICATION

This patent application is related to and claims priority from U.S. Provisional Patent Application Ser. No. 60/936,801 filed Jun. 22, 2007.

FIELD OF THE INVENTION

The present invention relates, in general, to animal control devices and, more particularly, this invention relates to head halters for dogs to aid in better control while walking with a leash.

BACKGROUND OF THE INVENTION

Prior to the conception and development of the present invention, dog owners and handlers have had many devices to choose from to aid in controlling an animal being walked. Most of these connect with a common walking leash. Traditional neck collars that buckle on do little to inhibit most dogs from excessive pulling. Choke collars are one option for better control. Another is a muzzle-style head halter that deters tugging by pulling the dog's head to one side. Many dog owners may consider these types to be inhumane or potentially harmful to their dog.

The prior art discloses numerous styles of halters, muzzles, and collars, or combination thereof, that purport good control in a humane way. In U.S. Pat. No. 4,566,255, DeGroot discloses a training halter for animals, dogs is particular, that attaches to a leash along side the dog's snout so that it can be readily turned to one side or the other. U.S. Pat. No. 4,483,275, also to DeGroot, discloses a similar dog head halter with an integral leash instead of one that clips to a ring. In both cases, the leash is off to one side and cannot be connected behind the head of the dog.

Anderson et al in U.S. Pat. Nos. 4,741,288 and 4,838,206 disclose a combination muzzle and dog collar with the aim of a more humane way to restrain and control dogs or other animals. As above, the leash connects under the dog's snout. It also tends to restrict the opening of the dog's mouth. Curran in U.S. Pat. No. 6,595,156 discloses numerous embodiments of a head halter for restraining animals, dogs in particular. Curran teaches a combination of straps including ones encircling the dog's snout and neck such that downward pressure can be applied to the top of the snout. Curran's devices have a reins portion for connecting to a leash, but that portion appears to always connect to the collar portion going around the neck. U.S. Pat. No. 4,722,171 teaches a bridle, primarily for horses, wherein a noseband connects to reins which cross underneath the snout.

SUMMARY OF THE INVENTION

The present invention provides a head harness for walking dogs and includes a nosepiece member attached to distal ends of at least one reins member having an attached leash ring and the nosepiece further being joined to two short connecting straps. A chin strap, a neck collar with a release buckle, and the two short straps are linked at the free ends by a connecting means such as a ring. The reins members are slidingly connected proximal the two distal ends.

In a most preferred embodiment, the reins members have attached reflective strips and a key pocket, and the collar member has two adjustment buckles.

OBJECTS OF THE INVENTION

It is, therefore, one of the primary objects of the present invention to provide an animal control harness that humanely aids the handler in achieving the desired animal behavior.

Another object of the present invention is to provide a collar for walking a dog that helps protect both the dog and handler from injury.

Still another object of the present invention is to provide a dog walking and training halter with improved control, and that also includes reflectors for nighttime walking.

Yet another object of the present invention is to provide a canine control collar/halter that still permits the dog to open its mouth for panting and chewing.

An additional object of the present invention is to provide a dog training and control harness that can be used as a muzzle when desired.

In addition to the various objects and advantages of the present invention described with some degree of specificity above, it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
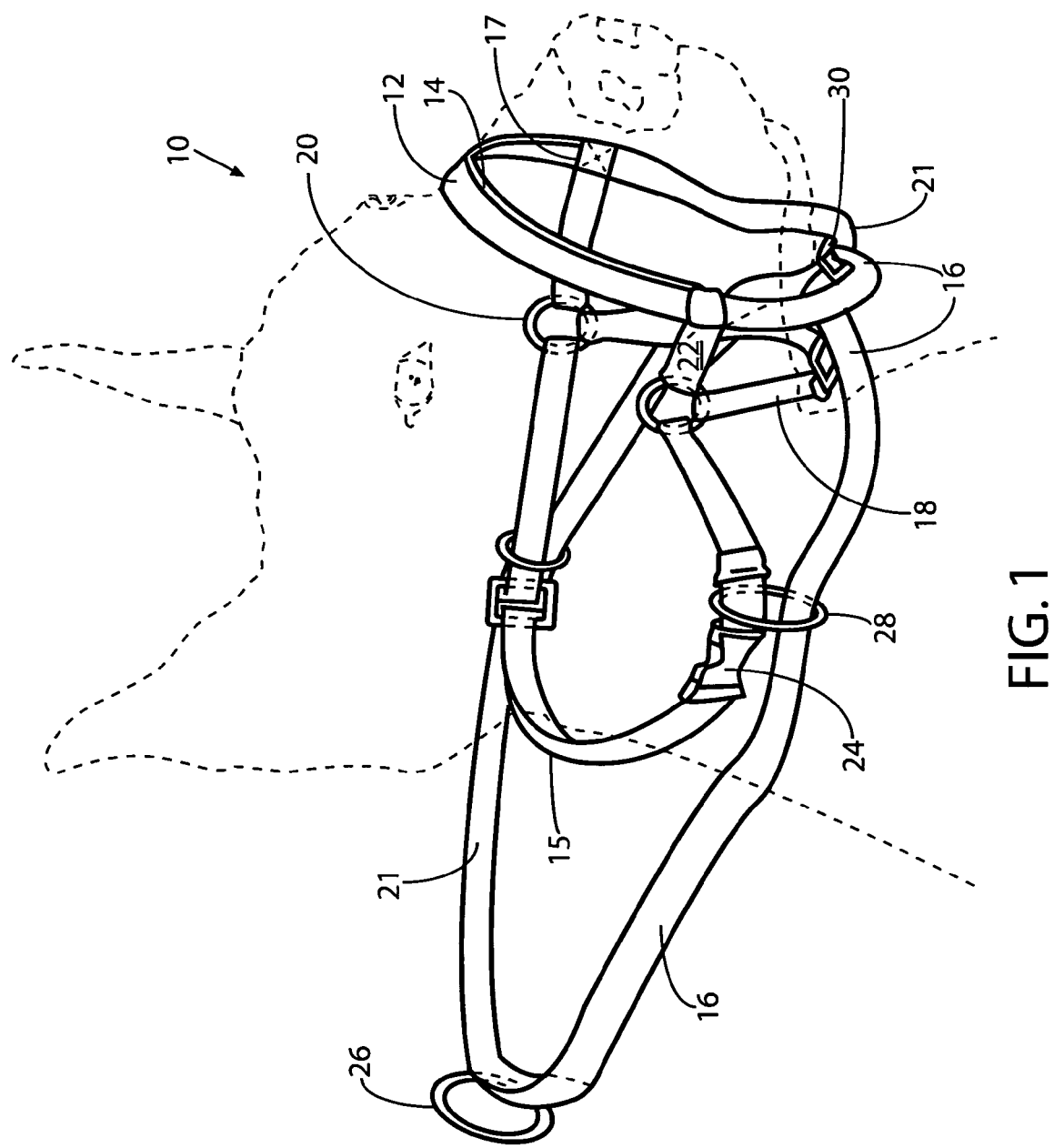
FIG. 1 is a perspective view of the present invention indicating how it would be worn on a dog.

DETAILED DESCRIPTION OF A PRESENTLY PREFERRED AND ALTERNATIVE EMBODIMENT OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

Referring initially to FIG. 1, the dog head harness 10 of the present invention is illustrated in perspective view with a phantom dog's head area. A nosepiece 12 has a padded lining 14, and then connects at junctions 17 with two short connecting straps 22 and the long reins straps 16 and 21. Proximal the junction 17, the right reins strap 16 and the left reins strap 21 are adjustably joined with buckle 30. The two long reins straps 16 and 21 then each diverge and pass through an optional guide ring 28, and finally meet and are fixedly joined at leash ring 26, which is sandwiched between the two ends of the reins straps 16 and 21. Alternatively, the two reins straps 16 and 21 could instead be one long continuous strap with a ring attached at the back midpoint. The reins members may be made from synthetic fiber straps, leather belts, or rope. Connecting rings 20 join together the short connecting straps 22, the chin strap 18, and the neck strap 15. The two sides of the neck strap 15 each pass through an optional guide ring 28 and are removably connected by adjustable side-release buckle 24.

In operation, the nosepiece 12 is placed on top of the dog's snout and the chin strap 18 under it. The neck strap 15 ends are connected together behind the dog's head with adjustable side-release buckle 24. This keeps the harness 10 in place on the dog's head. A walking leash can then be clipped to leash ring 26. As the dog is being walked, any tugging on the leash will create tension that is transmitted along the reins 16 and 21 and is translated to a downward force on the nosepiece 12. This pulls the dog's snout down toward its chest thus inhibiting it from pulling further.

Figure 2:
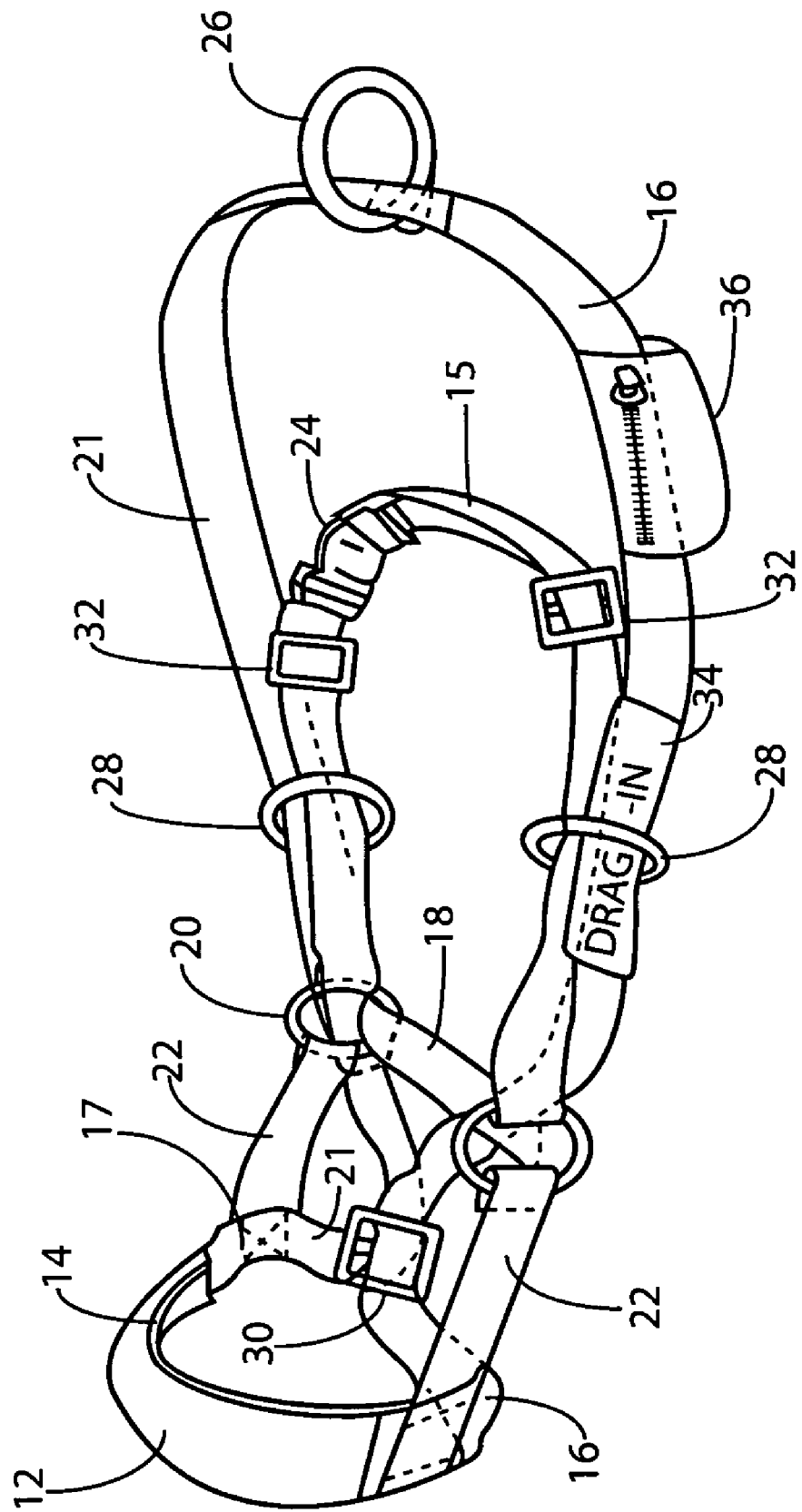
FIG. 2 is a perspective view of the present invention spread out on a surface.

FIG. 2 provides another perspective view of the head harness. Connecting rings 20 hold together the chin strap 18, collar member 15, and short connecting straps 22. The other ends of the short straps 22 connect substantially perpendicular with the nosepiece 12 and the ends of the right rein 16 and left rein 21 at juncture 17. Optional and preferred additions are reflective logo strips 34 along a portion of the reins members 16 and 21, and a key pocket 36. A leash connecting ring 26 is disposed near the center or juncture of the reins members 16 and 21. Near where the reins members 16 and 21 join to the nosepiece, they overlap in a dual slot slide buckle 30. This permits adjusting the snout opening under the nosepiece 12. Preferably, the nosepiece 12 has underside padding 14. The collar strap 15 comes with a side-release buckle 24 and two preferred but optional strap adjusters 32 for easing fitting to the dog. While adjustable to fit a range of dog sizes, the canine control halter can be made in one size to fit smaller dogs and a larger size to fit bigger dogs.

While a presently preferred and various alternative embodiments of the present invention have been described in sufficient detail above to enable a person skilled in the relevant art to make and use the same, it should be obvious that various other adaptations and modifications can be envisioned by those persons skilled in such art without departing from either the spirit of the invention or the scope of the appended claims.

What is claimed is:

1. A head harness for walking dogs comprising:
   a) a nosepiece member having a predetermined shape;
   b) at least one reins member joined to a leash attachment ring and providing two distal ends directly connected to ends of said nosepiece member
   c) two connecting straps with proximal ends attached substantially perpendicular to said nosepiece;
   d) two preselected connecting means each attached to a distal end of one of said two connecting straps for linking three strap ends;
   e) a chin strap with ends attached to said preselected connecting means;
   f) a neck collar with a release buckle having ends opposite said release buckle linked to said two preselected connecting means; and
   g) a means for slidingly joining said reins member proximal said two distal ends to permit adjusting a snout opening.

2. The head harness, according to claim 1, wherein said nosepiece member further includes underside padding.

3. The head harness, according to claim 1, wherein said at least one reins member includes at least one reflective attachment.

4. The head harness, according to claim 1, wherein said at least one reins member further includes an attached key pocket.

5. The head harness, according to claim 1, wherein said preselected connecting means is a ring.

6. The head harness, according to claim 1, wherein said means for slidingly joining said reins member proximal said two distal ends is a dual slot slide buckle.

7. The head harness, according to claim 1, wherein said neck collar further includes at least one strap adjuster.

* * * * *